(12) United States Patent
Lacrouts-Cazenave et al.

(10) Patent No.: US 10,518,673 B2
(45) Date of Patent: Dec. 31, 2019

(54) ERGONOMIC SEAT TILTING BETWEEN TWO CONFIGURATIONS

(71) Applicant: TOUTI TERRE, Rumilly (FR)

(72) Inventors: Flore Lacrouts-Cazenave, Moye (FR); Ivan Lacrouts-Cazenave, Saint Georges sur Loire (FR); Laurence Lacrouts-Cazenave, Rumilly (FR)

(73) Assignee: TOUTI TERRE, Rumilly (FR)

( * ) Notice: Subject to any disclaimer, the term of this patent is extended or adjusted under 35 U.S.C. 154(b) by 127 days.

(21) Appl. No.: 15/761,577

(22) PCT Filed: Sep. 19, 2016

(86) PCT No.: PCT/FR2016/052371
§ 371 (c)(1),
(2) Date: Mar. 20, 2018

(87) PCT Pub. No.: WO2017/051103
PCT Pub. Date: Mar. 30, 2017

(65) Prior Publication Data
US 2018/0339612 A1    Nov. 29, 2018

(30) Foreign Application Priority Data
Sep. 21, 2015  (FR) .................................... 15 58893

(51) Int. Cl.
*B60N 2/32* (2006.01)
*B60N 2/38* (2006.01)
(52) U.S. Cl.
CPC .................... *B60N 2/32* (2013.01); *B60N 2/38* (2013.01)

(58) Field of Classification Search
CPC ... B60N 2/32; B60N 2/38; B60N 2/02; B60N 2/20; B60N 2/18; B60N 2002/022; B60N 2002/0212; B60N 2002/0216; A01B 75/00; A01D 45/001
USPC .......................................................... 297/1
See application file for complete search history.

(56) References Cited

U.S. PATENT DOCUMENTS

| 3,037,570 A * | 6/1962 | Olson .................... A01B 75/00 180/6.5 |
| 4,526,248 A | 7/1985 | Johansen |
| 6,425,590 B1 * | 7/2002 | Whiteside ................ B25H 5/00 280/32.5 |
| 7,887,136 B2 * | 2/2011 | Zoell ...................... A47C 9/025 297/284.3 |

(Continued)

FOREIGN PATENT DOCUMENTS

FR    2996981    4/2014

*Primary Examiner* — Mark R Wendell
(74) *Attorney, Agent, or Firm* — Occhiuti & Rohlicek LLP (57) ABSTRACT

A chair includes a seat and a back rest, both of which pivot about respective axes between first and second positions thereof about parallel axes of rotation. The seat's second position is inclined relative to a first seat plane defined by the seat's first position. The backrest's second position is essentially parallel to the first seat plane such that the chair switches between seating and support configurations. In the seating configuration, the seat and backrest are their respective first positions such that the chair accommodates a seated person. In the support configuration, the seat and backrest are in their respective second positions such that the chair accommodates a person's chest on the backrest's rear face.

14 Claims, 8 Drawing Sheets

(56) References Cited

U.S. PATENT DOCUMENTS

| | | | |
|---|---|---|---|
| 9,193,064 B2* | 11/2015 | Dall'Armi | B25H 5/00 |
| 10,212,875 B2* | 2/2019 | Lacrouts-Cazenave | A01B 75/00 |
| 2012/0169019 A1 | 7/2012 | Grossberger | |

* cited by examiner

ERGONOMIC SEAT TILTING BETWEEN TWO CONFIGURATIONS

CROSS REFERENCE TO RELATED APPLICATION

This application is the national phase under 35 USC 371 of international application no. PCT/FR2016/052371, filed Sep. 19, 2016, which claims the benefit of the Sep. 21, 2015 priority date of French application no. 1558893.

TECHNICAL FIELD

The technical field of the invention is that of chairs, in particular ergonomic chairs, that can be deployed in different configurations. The principal application that is targeted is adaptation to working postures, in particular in the field of agriculture, while other applications may be envisaged, for example in the field of healthcare.

PRIOR ART

In spite of increased mechanization, relating to most sectors of industry, certain work is still heavily reliant on human activity. This is particularly true in the field of agriculture, and for example in the field of organic agriculture. It is known that, in a sector such as this, there is a desire to limit or even avoid recourse to techniques that are harmful to the environment, for example the use of pesticides or herbicides. A downside of this is that farmers have to carry out certain weeding, maintenance or harvesting tasks manually. This is particularly true of market gardening, involving multiple manual operations in contact with or close to the ground, which involves long periods working in a crouching, bent or kneeling posture. This makes the work laborious, without mentioning the possible consequences for health: backache, joint pain, etc.

Organic agriculture is currently on the rise, in response to increasing demand from many consumers for good quality products that are grown in an environmentally respectful way. Faced with an increase in land area cultivated using manual methods, it is desirable to have tools that are ergonomic and allow growers to perform manual operations in comfortable conditions.

Application FR1259976 responds to this need by proposing a motorized agricultural device which is of simple design and allows a farmer to carry out manual operations in multiple positions while retaining a certain degree of working comfort.

The inventors have sought to perfect this device by proposing a chair that is more ergonomic still and makes it possible to easily switch between two positions.

DISCLOSURE OF THE INVENTION

A first object of the invention is a chair comprising a seat and a backrest, the backrest comprising a front face and a rear face, the seat being able to pivot, about a first axis of rotation, between a first seat position defining a first seat plane and a second seat position that is inclined with respect to said first seat plane, the chair being characterized in that the backrest is able to pivot, about a second axis of rotation that is parallel to said first axis of rotation, between a first backrest position, for example essentially perpendicular to the first seat plane, and a second backrest position, in which the backrest is essentially parallel to the first seat plane such that the chair is able to switch:

from a first configuration, referred to as the seating configuration, in which the seat and the backrest extend in their respective first positions;

to a second configuration, referred to as the support configuration, in which the seat and the backrest extend in their respective second positions.

When the chair is deployed in the first configuration, it is suitable for receiving a person seated on the seat, whose back may rest against the front face of the backrest. When the chair is deployed in the second configuration, it is suitable for receiving a person, in particular lying down, whose chest rests on the rear face of the backrest.

The chair may in particular be mounted on an agricultural device, in which case the support position allows a farmer to work in the prone position, facing the ground, in order to carry out manual tasks. One of the advantages of this chair is particularly simple manipulation, allowing particularly simple switching between the seating position and the support position, since all that is required is to pivot the backrest and the seat about their respective axes of rotation.

According to one embodiment, during switching between the seating configuration and the support configuration, the seat and the backrest pivot in opposite directions of rotation, respectively about said first and second axes of rotation.

According to one embodiment,
in the seating configuration, the seat and the backrest define a first angle greater than 70° and preferably less than 130°,
in the support configuration, the seat and the backrest define a second angle greater than 120° and preferably less than 180°, or even 160°.

Advantageously, the chair may comprise a drive mechanism that is able to power, simultaneously, pivoting of the seat and pivoting of the backrest. This mechanism may in particular be triggered by pivoting of the backrest. In this case, preferably, the seat rests on a mount, referred to as the seat mount. The drive mechanism may then comprise:

a first connecting rod extending in a first longitudinal direction perpendicular to said first axis of rotation, between a first end fixed to the seat and a second end, said first connecting rod comprising a slot that extends in said first longitudinal direction, said first connecting rod being mobile in rotation about a third axis of rotation, preferably parallel to said first and second axes of rotation, and fixed to the seat;

a transverse bar fixed to the backrest and extending transversely to said slot, and preferably parallel to said first and second axes of rotation, and able to slide in said slot when the backrest pivots;

a second connecting rod extending in a second longitudinal direction perpendicular to said first axis of rotation, between a first end fixed to said seat mount and a second end fixed to said second end of said first connecting rod, and mobile in rotation with respect to the latter, said second connecting rod being mobile in rotation about a fourth axis of rotation fixed to said seat mount, and preferably parallel to the third axis of rotation, and about a fifth axis of rotation fixed to said first connecting rod;

such that translation of the transverse bar in the slot causes a rotation of said first connecting rod and a rotation of said second connecting rod, the rotation of the first connecting rod being in a direction opposite that of the rotation of the second connecting rod.

The chair may comprise one or more of the following features, considered in isolation or according to the technically feasible combinations:

During pivoting between the first seat position and the second seat position, the seat rotates, about the first axis of rotation, through a first rotation angle of between 20° and 80°, and preferably between 30° and 60°.

During pivoting between the first backrest position and the second backrest position, the backrest rotates, about the second axis of rotation, through a second rotation angle of between 60° and 130°, and preferably between 70°, or even 80°, and 120° in a direction of rotation counter to the direction of rotation of the seat.

The backrest extends between a proximal end and a distal end and comprises, at the level of said distal end, a headrest support of which the distance to said proximal end can vary.

The chair is mobile about an axis of rotation which is essentially perpendicular to said first seat plane and about which the chair can turn, in either one of the seating and support configurations.

The chair rests on a chassis, the chair being mobile in translation with respect to said chassis, so as to move closer to or further from said chassis. In such a configuration:
the connection between the chair and the chassis can be brought about by a mount comprising a hydraulic cylinder;
the chair can be fixed to a frame such that the assembly forming the chair and the frame is mobile in translation with respect to the chassis.

The backrest of the chair extends between a proximal end and a second distal end, said proximal end being adjacent to the seat such that the width of the chair reduces between said proximal end and said distal end. This reduces any obstruction of the movement of the arms of a person whose chest is resting on the backrest, when the chair is in the support configuration.

The seat may comprise a first cushion suitable for providing support during the seating position and during the support position. The backrest may comprise, on its front face, a second cushion suitable for providing dorsal support and, on its rear face, a third cushion suitable for providing support for the chest of a person, or thoracic support. Preferably, the second cushion and the third cushions are arranged face-to-face, on either side of a backrest frame. Preferably, the second and third cushions are in the form of a cross, similar to the shape of the letter X, extending parallel to the backrest from a central portion such that, when the backrest is in the second position of the backrest, a person can reach their arms around either side of said central portion.

Another object of the invention is an agricultural device that is able to move over ground, comprising a chair as described in this description.

Another object of the invention is an ergonomic device for personal movement, for example for a disabled person, or designed for a person undergoing functional re-education, the device comprising a chair as described in this description.

Another object of the invention is an agricultural device that is able to move over ground, comprising a chair, suitable for receiving a person in the seated position, the agricultural device comprising a chassis connected to the chair by a mount, the mount allowing a translational movement of the chair with respect to the chassis so as to move the chair closer to or further from this chassis, the device being characterized in that the chair is fixed to a frame, said frame extending essentially parallel to the ground, between a front end and a rear end, the frame being configured to support tools that are suitable for being in contact with the ground.

The chair can in particular comprise any one of the features presented in this description.

The invention will be better understood upon reading the description of the examples of embodiment, which description is presented hereinbelow and refers to the following figures.

FIGURES

FIGS. 1A and 1B respectively show an embodiment of the invention, in which the chair is arranged on a device suitable for carrying out agricultural tasks, in particular for market gardening.

In the figures, identical references designate identical elements.

DISCLOSURE OF PARTICULAR EMBODIMENTS

Figure 1A:
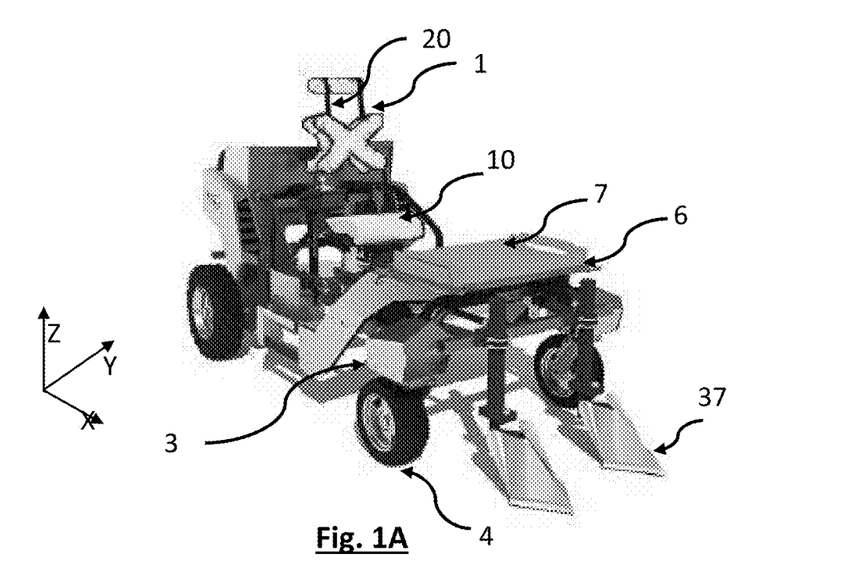

FIG. 1A shows an example of a chair 1 according to the invention, arranged on an agricultural device 2 designed for market-gardening tasks. The agricultural device comprises a chassis 3 supported by four wheels 4. These wheels define, in pairs, a front axle and a rear axle. The device may be controlled by a person seated on the chair 1, the chair being in a first configuration referred to as the seating configuration. The chair comprises a seat 10 on which a person can sit, and a backrest providing dorsal support. The device comprises a platform 6, which is arranged at the front and on which it is possible to place tools or trays 7. The device may support tools 37 arranged at the front and/or at the rear.

In all of the figures that illustrate the invention, reference is made to an XYZ coordinate system in which the X and Y axes define a horizontal plane that is parallel to the surface of the ground and on which the device rests, while the Z axis defines a vertical plane that is perpendicular to the surface of the ground.

Figure 1B:
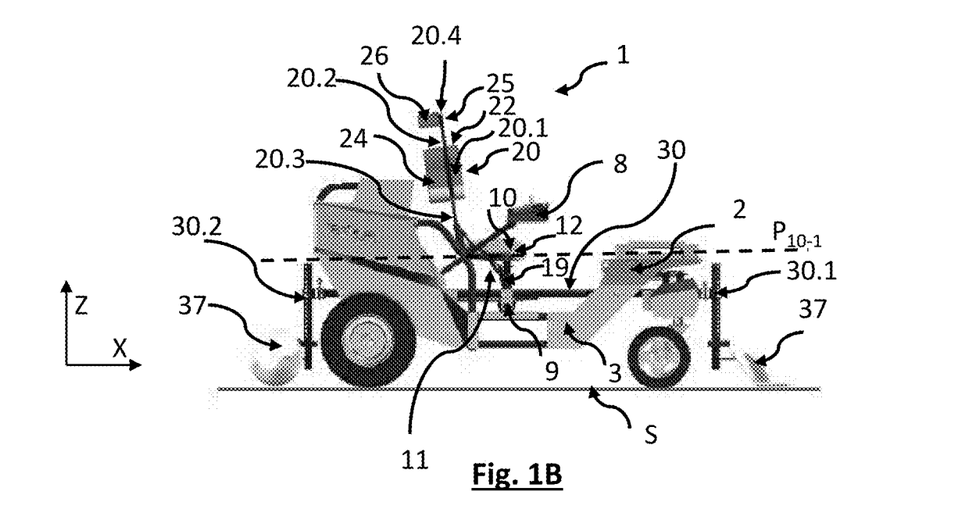
FIG. 1B is a side view of the device shown in FIG. 1A.

FIG. 1B shows a side view of the agricultural device shown in FIG. 1A. The seat 10 extends in a plane $P_{10\text{-}1}$, referred to as the first seat plane, and the backrest 20 extends essentially orthogonal to the first seat plane. Essentially orthogonal is understood to mean forming an angle of greater than 70° and preferably less than 130°. In this example, this angle is of the order of 100°.

The chair 1 comprises a first cushion 12 that is arranged at the level of the seat. Furthermore, the backrest comprises a first face 20.1, referred to as the front face, and a second face 20.2 which is referred to as the rear face and is opposite the front face. The front face 20.1 of the backrest is able to form a dorsal support when the chair is in the seating configuration, as shown in FIG. 1B. The front face 20.1 may comprise a second cushion 22 so as to improve the comfort of the person seated on the chair. The rear face 20.2 comprises a third cushion 24 opposite the second cushion 22. This third cushion is described in greater detail later in the description.

The backrest extends between a proximal end 20.3, located close to the seat 10, and a distal end 20.4. This distal end 20.4 may comprise a headrest 25, wherein the distance between the headrest and said proximal end can be made variable so as to conform to the morphology of the seated person. At the level of this distal end, the rear face 20.2 of the backrest may comprise a fourth cushion 26, whose purpose will be described later. In the manner of the headrest 25, the distance between this fourth cushion 26 and the proximal end 20.3 can be adjusted.

The chair 1 is fixed to the chassis 3 by means of a mount 19, this mount being fixed to a base 9 that forms part of the chassis 3. In this example, the first seat plane $P_{10\text{-}1}$, sometimes referred to as the seat plane, is parallel to the XY plane. The mount 19 extends transversely, and preferably perpendicularly, to the first seat plane. In this case, the mount 19 allows the chair 1 to translate in a direction transverse, and preferably perpendicular, to the first seat plane $P_{10\text{-}1}$. This allows the chair to be raised or lowered with respect to the chassis 3. Thus, the chair can move away from or closer to the ground S over which the device 2 is able to move. The chair 1 is also fixed to a frame 30 that extends on either side of the chair between a front end 30.1 and a rear end 30.2. The frame is fixed to the chair by a rigid connection. Thus, during translation of the chair with respect to the chassis 3, the frame is able to move away from or closer to the ground S. The front and rear ends of the frame 30 make it possible to mount agricultural tools 37, for example a plow. Thus, the frame 30 acts as a tool mount and its translation transversely, and preferably perpendicularly, to the chassis 3 makes it possible to adjust the distance between said agricultural tools 37 and the ground S over which the device moves.

Figure 1C:
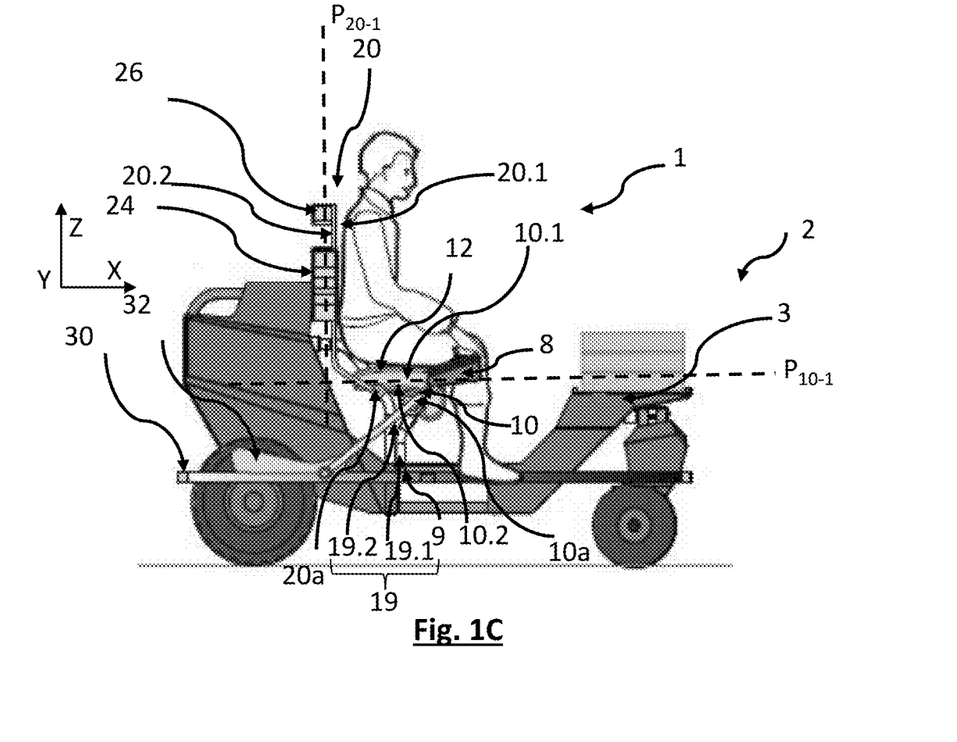
FIGS. 1C and 1D respectively show an example of an agricultural device, comprising a chair according to the invention, this chair being respectively configured in a seating configuration and a support configuration.
Figure 1D:
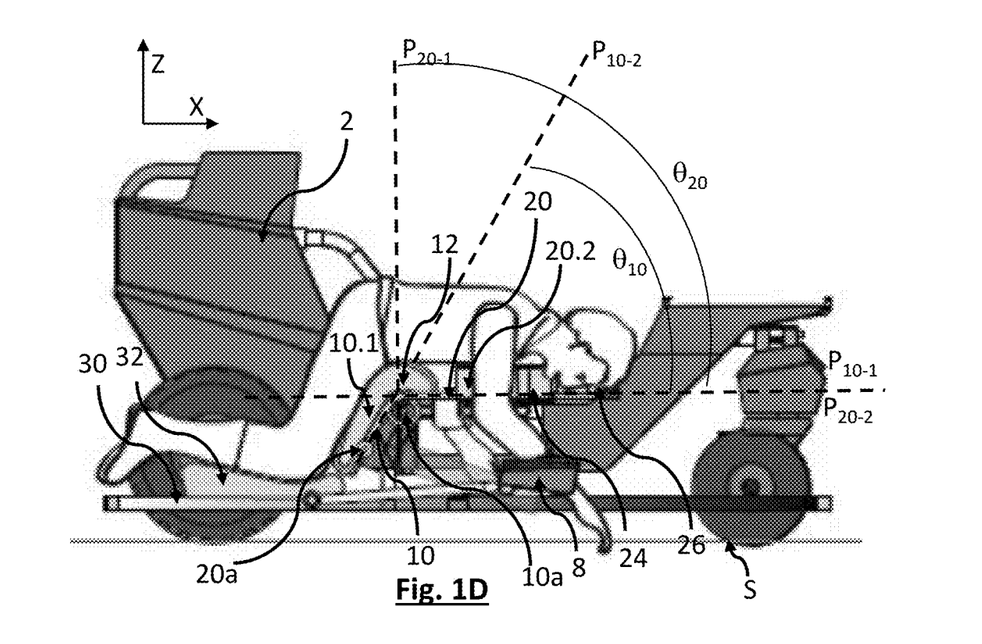

The chair 1 comprises a drive mechanism 11 allowing it to switch between a seating configuration, as shown in FIGS. 1A, 1B and 1C, and a configuration referred to as the support configuration, as shown in FIG. 1D.

The chair also comprises an arm at the end of which there is a control 8 for controlling the device 2, and possibly for controlling the translation of the chair with respect to the chassis 3.

FIG. 1C shows a person seated on a chair 1, this chair being fitted to a device 2 similar to that described in the context of FIGS. 1A and 1B. This figure is a view in section along a vertical and median plane of section of the device, that is to say a plane parallel to the X and Z axes and passing through the middle of the rear axle and through the middle of the front axle of the device 2.

The person is seated on the first cushion 12 that is fitted to the seat 10, and their back rests against the front face 20.1 of the backrest 20. The seat comprises an upper face 10.1 and a lower face 10.2, such that a seated person rests on the upper face 10.1. The chair is connected to a frame 30, as described previously. The chair rests on a mount 19, which provides a connection between the chair and the chassis 3 of the device 2. This mount 19 extends between a first end 19.1, adjacent to the chassis 3, and a second end 19.2, adjacent to the seat 10. In order to allow the chair 1 to translate with respect to the chassis along the Z axis, the first end 19.1 of the mount comprises a translation means, for example a hydraulic cylinder. This hydraulic cylinder can in particular be controlled using the control 8 described previously. It fits into a base 9 created in the chassis 3. The mount 19 is also able to permit a rotation of the chair 1 parallel to the chassis 3, that is to say about the Z axis, the cylinder itself acting as the rotation spindle.

In this example, the frame 30 extends in a plane referred to as the frame plane. It comprises a fifth cushion 32 which extends essentially parallel to this plane and whose function is described with reference to FIG. 1D. Thus, the frame also acts as a support for the fifth cushion 32. FIG. 1C also shows the third cushion 24 and the fourth cushion 26, described previously.

The chair 1 comprises a first axis of rotation 10a, parallel to the Y axis, about which the seat 10 is able to pivot, between a first seat position and a second seat position that is inclined with respect to said first seat position. The Y axis is perpendicular to the XZ plane. The first seat position allows a person to sit on the seat, as shown in FIGS. 1A, 1B and 1C. In the first seat position, the seat extends in the first seat plane $P_{10\text{-}1}$. Preferably, the first seat plane $P_{10\text{-}1}$ is essentially parallel to the XY plane. In the second seat position, the seat extends in a second seat plane $P_{10\text{-}2}$, described with reference to FIG. 1D.

The chair 1 comprises a second axis of rotation 20a, about which the backrest is able to pivot, between a first backrest position and a second backrest position, the latter being essentially parallel to said first seat plane $P_{10\text{-}1}$. The second axis of rotation 20a is preferably parallel to and distinct from the first axis of rotation 10a. The first position of the backrest allows a seated person to rest against the backrest, as shown in FIGS. 1A, 1B and 1C.

In its first position, the backrest extends in a first backrest plane $P_{20\text{-}1}$, while in its second position, the backrest extends in a second backrest plane $P_{20\text{-}2}$, described with reference to FIG. 1D. Preferably, the first backrest plane $P_{20\text{-}1}$ is essentially orthogonal to the first seat plane $P_{10\text{-}1}$, the term essentially orthogonal referring to orthogonality to within a close angular tolerance, for example of plus or minus degrees.

One of the important points of the invention is that the chair is able to switch between a first configuration, referred to as the seating configuration, that is able to receive a seated person, and a second configuration, referred to as the support configuration, on which a person can rest lying down. Lying down is understood as meaning that the chest rests on a support surface, this surface being essentially horizontal. Essentially horizontal is understood as meaning parallel to the ground, with an angular tolerance of plus or minus 30 degrees, or plus or minus 20 degrees.

FIG. 1D shows a chair identical to that shown in FIG. 1C, arranged in said support configuration. The seat 10 is positioned in the second seat position, mentioned above, and extends in a second seat plane $P_{10\text{-}2}$ that is inclined with respect to said first seat plane $P_{10\text{-}1}$, by a first angle of rotation $\theta_{10}$, preferably between 20° and 80°, more preferably between 30° and 60°, and for example equal to 60°.

The backrest 20 is positioned in the second backrest position, mentioned previously, and extends in a second backrest plane $P_{20\text{-}2}$, essentially parallel to the first seat plane $P_{10\text{-}1}$, that is to say within plus or minus 30° of parallel, or even within plus or minus 20°. In this example, the second backrest plane $P_{20\text{-}2}$ is the same as the first seat plane $P_{10\text{-}1}$. Generally, between the first backrest position and the second backrest position, the backrest 20 pivots about the second axis of rotation 20a through a second rotation angle $\theta_{20}$ of preferably between 60° and 130°, more preferably between 70°, or even 80°, and 120°, and for example equal to 90°.

When pivoting from their first positions to their respective second positions, the seat 10 and the backrest 20 pivot, respectively about the first and second axes of rotation, in opposite rotation directions.

The chair 1, in the support configuration, is suitable for accommodating a person in what is referred to as the support position. The chest of this person rests on the rear face 20.2 of the backrest 20. Preferably, the thighs of this person rest on the seat 10, and in particular on the upper face of the seat 10.1. In this example, as described previously, the rear face 20.2 comprises a third cushion 24, providing more comfortable support. Preferably, the chair comprises a fourth cushion 26, described previously, this cushion serving as a frontal support. The fifth cushion 32, borne by the frame 30 connected to the chair 1, allows support for the legs of the person in the support position.

Thus, the person is supported by the rear face 20.2 of the backrest 20 and is positioned facing the ground S, in a lying-down position, that is to say resting on the chest. The person can then perform manual tasks while very close to and above the ground. The person is then in a particularly comfortable position for working at ground level without having to bend over, crouch or kneel. A posture of this kind, which is particularly ergonomic, significantly reduces the arduousness of the work.

The arm connecting the control 8 can also pivot, such that the person can control the device 2 while positioned in this support posture. Depending on the type of ground and/or the nature of the manual work to be performed, it is possible to adjust the distance between the person and the ground using the mount 19, and in particular the hydraulic cylinder 19.1, allowing translation perpendicular or essentially perpendicular to the first seat plane $P_{10\text{-}1}$. This allows easy adaptation of the position of the person depending on the conditions encountered.

Figure 3:
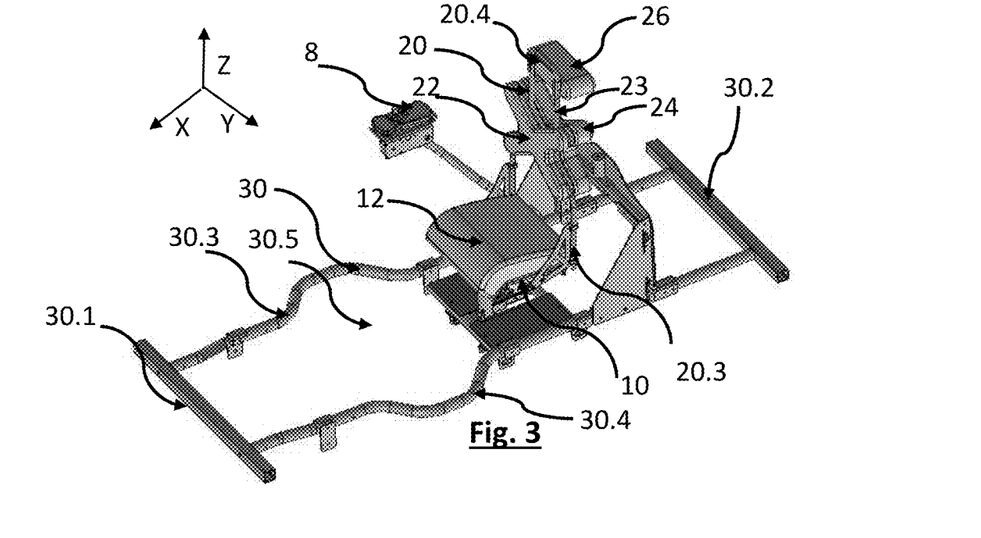
FIG. 3 shows the chair shown in FIGS. 2A, 2B and 2C connected to a frame, this frame being able to serve as a mount for tools.

FIG. 3 shows a three-dimensional view of a chair 1 according to the invention, in the seating configuration. The frame 30, fixed to the chair, defines an essentially quadrilateral shape. The front 30.1 and rear 30.2 portions are connected by two transverse spars 30.3 and 30.4, extending on either side of the chair, such that the frame extends in a plane referred to as the frame plane. In this example, the frame plane is parallel to the XY plane. The transverse spars 30.3 and 30.4 define a locally widened region 30.5 so as to permit movement of the arms of the person when the chair is in the support configuration, the frame being between the backrest 20, on which the person rests, and the ground. As mentioned previously, the frame comprises a front end 30.1 and a rear end 30.2 that are able to support tools 37, the latter not being shown in this figure. This makes it possible to carry out a manual operation, the chair being in the support configuration, at the same time as mechanized operations using said tools 37 while the device is moving. This also makes it possible to alternate mechanized operations, with the chair in its seating configuration, and manual operations, with the chair in its support configuration. In this example, the frame is made from metal profiles or tubes, making it rigid and lightweight.

Preferably, the width of the backrest 20 is designed so as to allow the arms to pass on either side of the backrest while in the support configuration, as is clear from FIG. 1D. Also, the width of the backrest reduces between its proximal end 20.3 and its distal end 20.4. This makes it easier for the arms to reach around while in the support position, without reducing comfort in the seating position.

The seat and the backrest can respectively be pivoted in succession, one after the other. However, it is preferable for these pivoting movements to be carried out simultaneously, so as to rapidly switch the chair between the seating configuration and the support configuration. These simultaneous pivoting movements can be carried out by means of a mechanical drive system 11, as shown in FIGS. 2A, 2B and 2C.

Figures 2A, 2B:
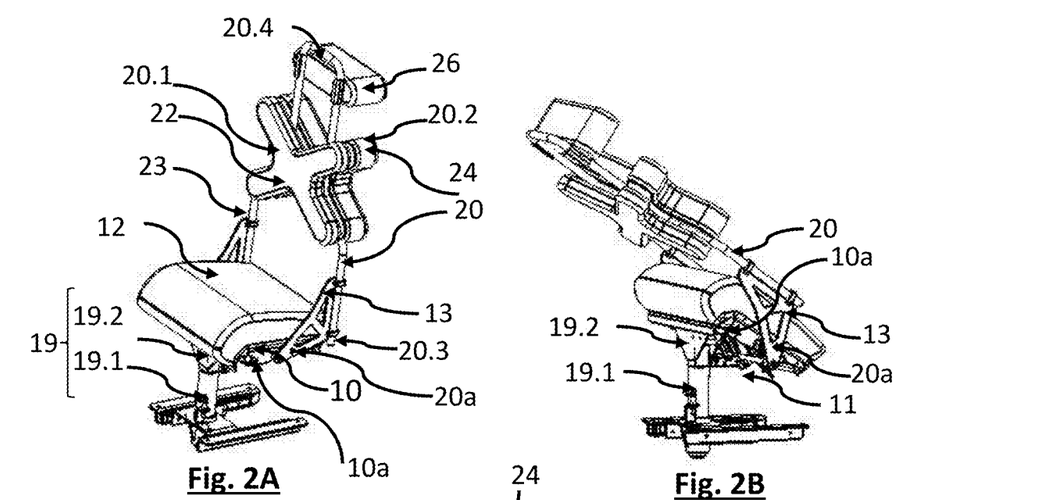
FIGS. 2A, 2B and 2C respectively show an example of a chair in a seating configuration, an intermediate configuration and a support configuration.
Figure 2C:
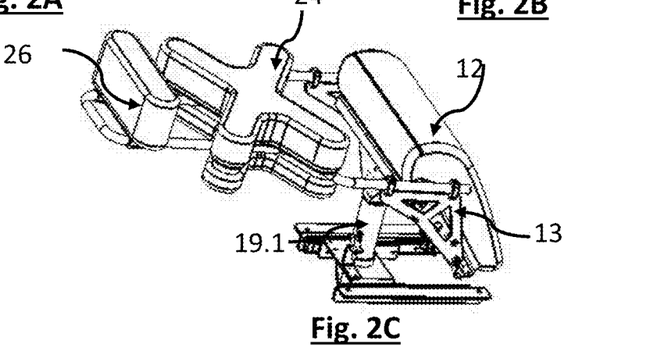

FIG. 2A shows an example of a chair in the seating configuration. As shown in FIGS. 2A and 3, the backrest 20 comprises a tubular metallic structure 23, the width of which reduces between the proximal end 20.3 and the distal end 20.4. The front face 20.1 of the backrest 20 comprises a second cushion 22 providing dorsal support when the chair is in the seating configuration. The rear face 20.2 comprises a third cushion 24 and a fourth cushion 26 that respectively provide support for the chest (or thoracic support) and support for the forehead when the chair is in the support configuration. In this latter configuration, the shape of the second cushion 22 and of the third cushion 24 can be adapted so as to make it easier for the arms to reach around on either side of the backrest. For example, these two cushions can be in the shape of a cross, taking the form of the letter X, the arms of which extend from a central portion that forms the center of the cushion. The arms of a person resting on the third cushion 24 can pass between the arms of such a cross. This cross shape proves optimal in terms of comfort and space.

The chair 1 also comprises a connection between the backrest 20 and the seat 10, which connection is formed by two lateral brackets 13, transversely to which extends the second axis of rotation 20a, about which the backrest 20 pivots. The chair can be connected to a chassis 3 by a mount 19, comprising a lower portion 19.1, forming for example a hydraulic cylinder, and an upper portion 19.2. As described previously, the hydraulic cylinder permits a translation of the chair along an axis transverse to the chassis (or to the seat 10), and possibly a rotation of the chair in a plane parallel to the plane of the chassis (or to the plane of the seat 10).

The chair comprises a drive system 11 arranged below the seat 10, between the seat 10 and the mount 19. This drive system 11 is connected to the backrest via the lateral brackets 13. It permits simultaneous pivoting of the backrest 20 and of the seat 10, respectively about the second axis of rotation 20a and the first axis of rotation 10a. Preferably, switching of the chair is controlled by the backrest 20, such that pivoting of the backrest, initiated for example manually, causes the pivoting of the seat, this being from the seating configuration to the support configuration or, conversely, from the support configuration to the seating configuration.

FIG. 2B shows the chair in a configuration referred to as the intermediate configuration, between the seating configuration and the support configuration. FIG. 2C shows the chair in the support configuration. It is noted that the backrest 20 pivots about the second axis of rotation 20a in a rotation direction counter to that of the pivoting of the seat 10 about the first axis of rotation 10a.

Figure 4A:
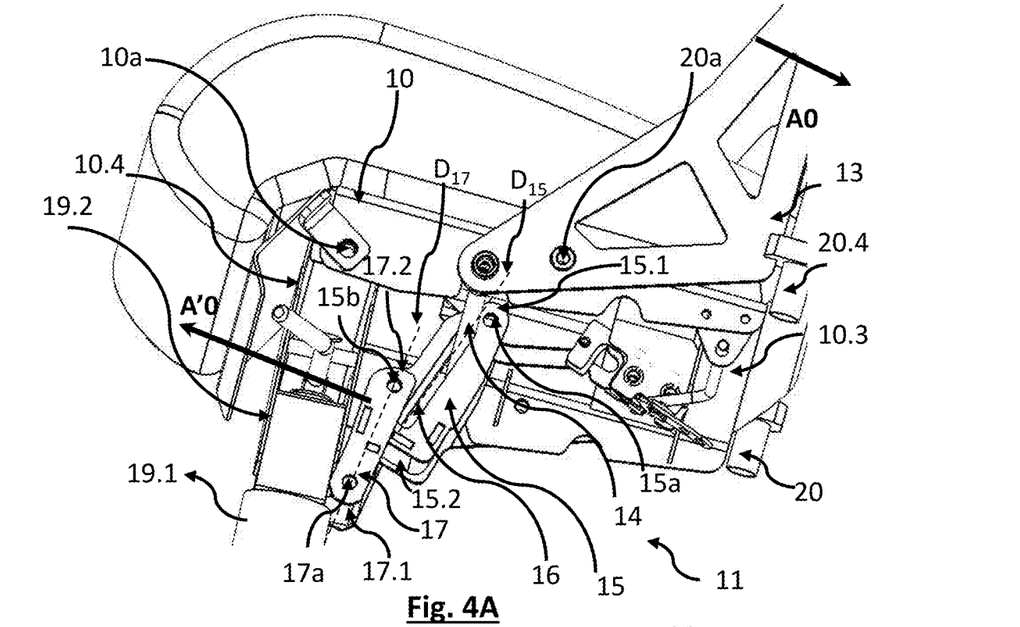
FIGS. 4A, 4B and 4C show a drive mechanism allowing the chair to switch between the seating configuration (FIG. 4A) and the support configuration (FIG. 4C), the mechanism being in the configurations corresponding respectively to FIGS. 2A, 2B and 2C.
Figure 4B:
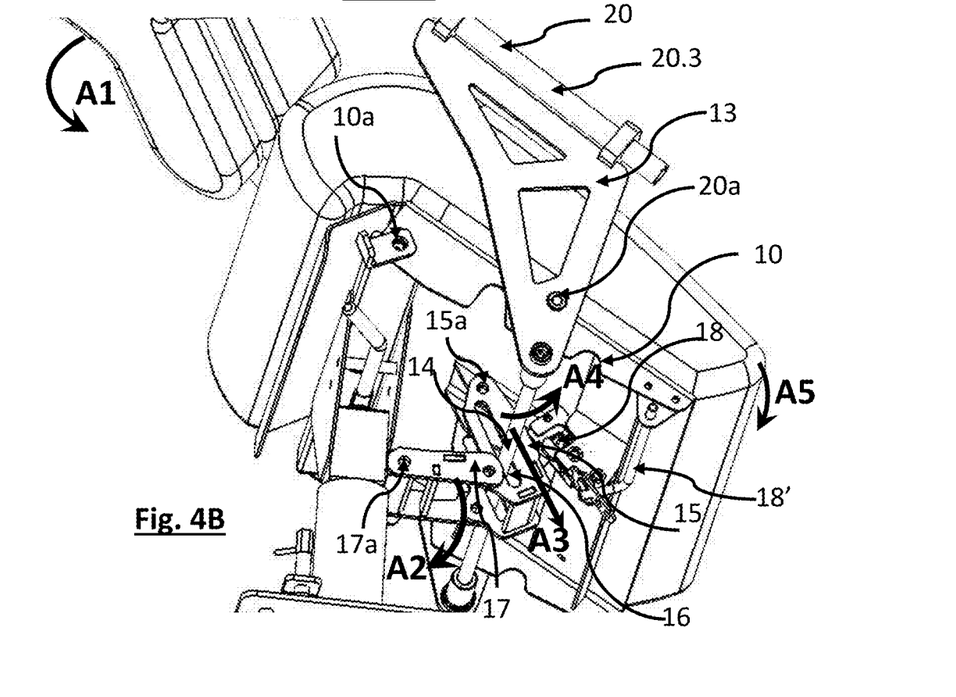
Figure 4C:
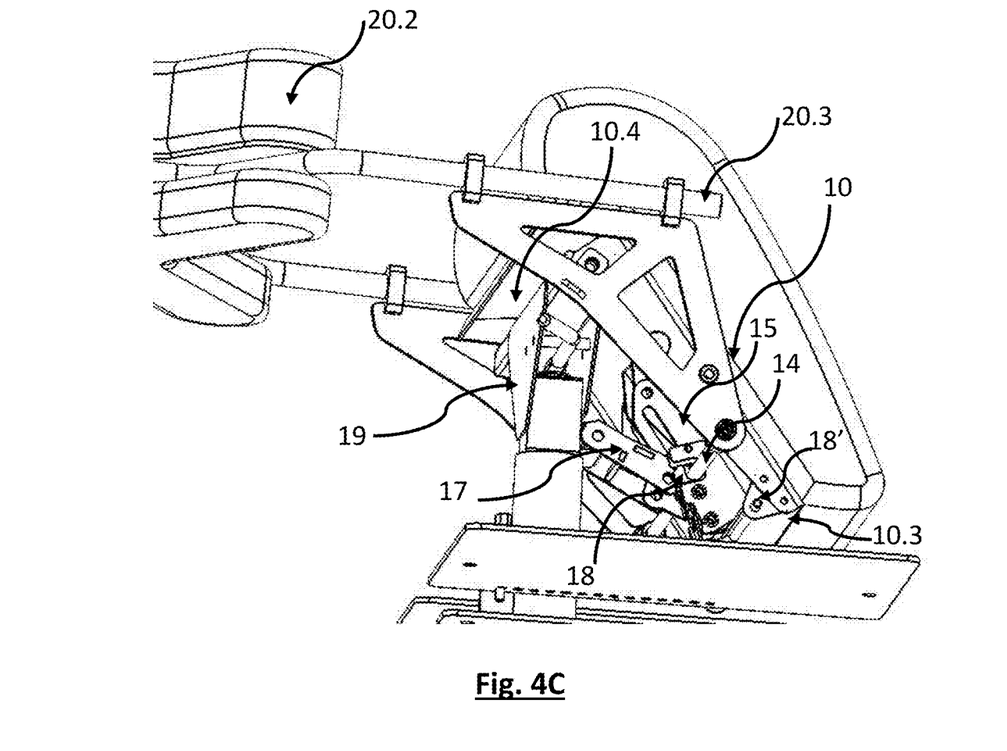

There follows a detailed explanation, with reference to FIGS. 4A, 4B and 4C, of a non-limiting example of a transmission system 11 with which the previously described simultaneous pivoting movements are possible. FIG. 4A shows the chair 1 deployed in a seating configuration. The seat extends between a rear end 10.3, adjacent to the backrest 20 (and in particular adjacent to its proximal end 20.3) when the chair is deployed in the seating configuration, and a front end 10.4. The transmission system 11 comprises:

- a transverse bar 14 extending between the lateral brackets 13, and held thereby, and consequently fixed to the backrest 20. This transverse bar extends parallel to the first and second axes of rotation.
- a first connecting rod 15 extending, in a first longitudinal direction $D_{15}$, between a first end 15.1, fixed to the seat 10, and a second end 15.2, this connecting rod comprising a slot 16 extending in said first longitudinal direction $D_{15}$, between the ends 15.1 and 15.2.
- a second connecting rod 17, extending in a second longitudinal direction $D_{17}$ between a first end 17.1, fixed to the mount 19, and a second end 17.2.

The transverse bar extends transversely to the slot 16 in which it is able to slide. The first connecting rod 15 is mobile in rotation about a third axis of rotation 15a that is parallel to the first and second axes of rotation. In this example, this third axis of rotation forms a connection between the first connecting rod 15 and the seat 10, at the level of the first end 15.1 of this first connecting rod.

The second connecting rod 17 is mobile in rotation about a fourth axis of rotation 17a, parallel to the third axis of rotation 15a. In this example, this fourth axis of rotation forms a connection between the second connecting rod 17 and the mount 19, at the level of the first end 17.1 of this second connecting rod.

The first connecting rod 15 and the second connecting rod 17 are connected to one another, at the level of their respective second ends 15.2 and 17.2, by a freely rotating connection defining a fifth axis of rotation 15b that is parallel to the third axis of rotation 15a and to the fourth axis of rotation 17a.

In the configuration shown in FIG. 4A, a person sitting on the chair and resting against the backrest 20 exerts a force A0 on the backrest, tending to keep the transverse bar 14 pressed against the first end 15.1 of the first connecting rod and, by the intermediary of the first connecting rod 15, tending to push the second connecting rod 17 towards the mount 19, exerting a thrust force A'0. The mount 19 then acts as a first stop, by which the seat 10 and the backrest 20 can be held in their respective first positions.

In the configuration shown in FIG. 4B, referred to as the intermediate configuration, the backrest 20 has been inclined so as to approach the seat 10. The transverse bar 14 then slides in the slot 16, in the direction A3, driving a rotation of the first connecting rod 15, about the third axis of rotation 15a, in a direction of rotation A4. This also drives a rotation of the second connecting rod 17 in a direction of rotation A2, counter to the direction of rotation A4, about the fourth axis of rotation 17a. The friction of the connecting rod along the slot 16 causes the rotation of the seat 10 in a direction of rotation A5 that is counter to the direction of rotation A1 of the backrest. The first connecting rod 15 and the second connecting rod 17 remain connected to one another and pivot, with respect to one another, about the fifth axis of rotation 15b.

FIG. 4C shows the chair deployed in the support configuration, in which the first connecting rod 15 is blocked in rotation against the seat 10, the seat then acting as a second stop, by which the seat 10 and the backrest 20 can be held in their respective second positions. A person pressing on the rear face 20.2 of the backrest tends to urge the second connecting rod 15 in the direction of the seat 10, which tends to hold the chair in the support configuration. In the support configuration, the proximal end 20.3 of the backrest 20 is adjacent to the front end 10.4 of the seat 10, whereas, in the seating configuration, the proximal end 20.3 of the backrest is adjacent to the rear end 10.3 of the seat.

Advantageously, the drive mechanism 11 comprises a catch 18 in which the transverse bar engages when the seat reaches its second position. This catch 18 then forms an additional lock for this position. The transverse bar 14 can be freed from the catch by means of a lever 18', shown in FIG. 4B, by which it is possible to open the catch 18.

Passing from the support configuration to the seating configuration is brought about by returning the backrest from its second position to its first position. The transverse bar 14 then slides in the slot 16 in a direction counter to the direction A3 described previously with reference to FIG. 4B. The movement of the bar combined with the rotation of the first and second connecting rods makes it possible to return the seat from its second position to its first position.

Figure 5A:
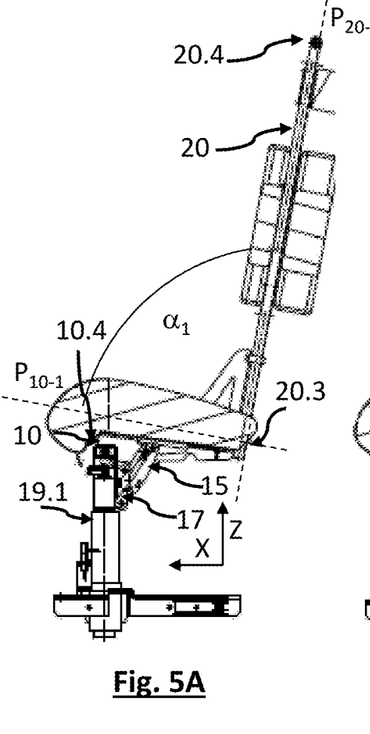
FIGS. 5A, 5B, 5C, 5D and 5E show side views of a chair passing progressively from the seating configuration (FIG. 5A) to the support configuration (FIG. 5E). These figures make it possible to visualize the motion of the principal components of the chair, in particular the seat and the backrest.
Figures 5B, 5C:
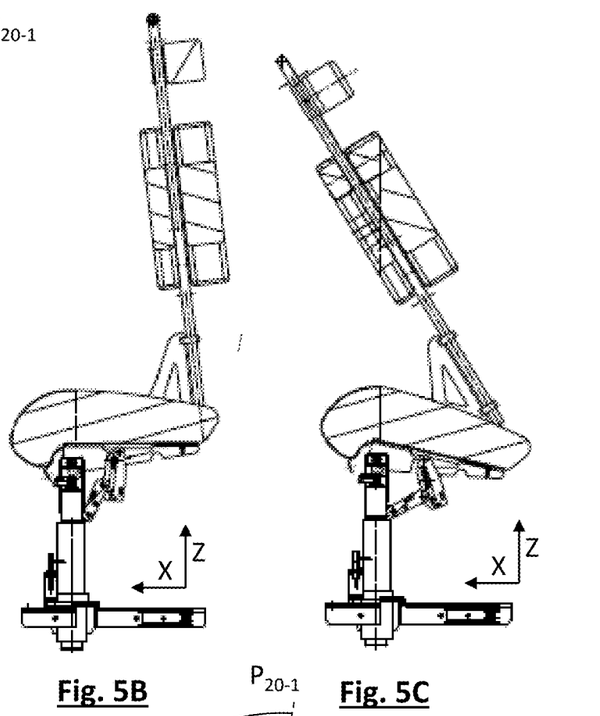
Figures 5D, 5E:
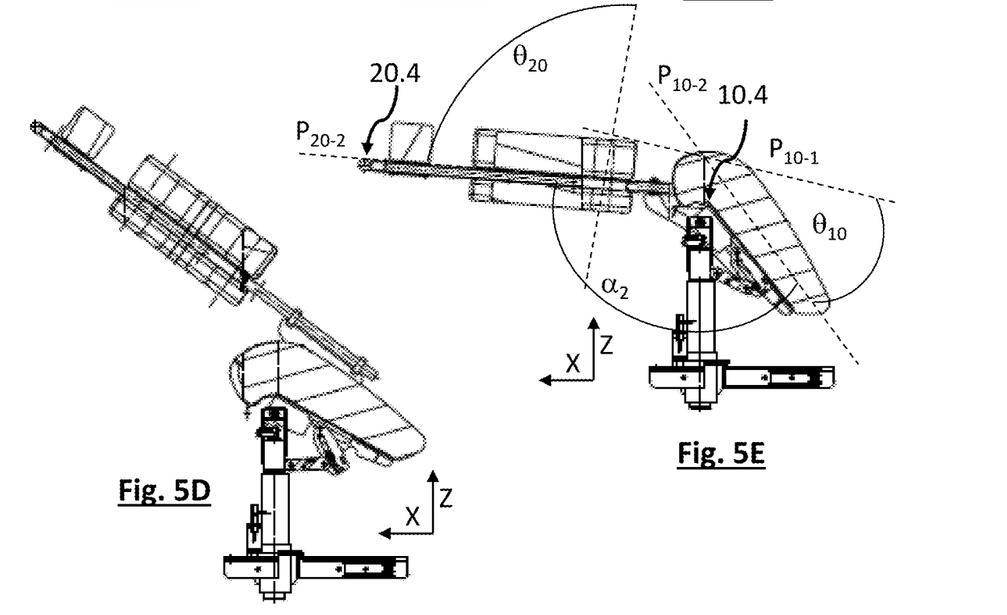

FIGS. 5A to 5E show various configurations of the chair, between a seating configuration, shown in FIG. 5A, and a support configuration, shown in FIG. 5E. The intermediate configurations shown in FIGS. 5B, 5C and 5D explain the mechanics of switching the chair 1 between the seating and support configurations, and in particular the rotation of the seat 10 and of the backrest 20, and the rotations of the connecting rods 15 and 17.

FIG. 5A shows the angle $\alpha_1$ extending between the first seat plane $P_{10\text{-}1}$ and the backrest, extending in the first backrest plane $P_{20\text{-}1}$, in the seating configuration. In this case, this angle is close to 90°. It is generally between 70° and 130°, and is preferably between 70°, or even 80° or 90°, and 120° or 130°. FIGS. 5B, 5C and 5D show that, during pivoting from the seating configuration to the support configuration, the backrest pivots about the second axis of rotation 20a, such that the distal end 20.4 of the backrest moves closer to the seat 10, and in particular to the front end 10.4 of the seat 10. FIG. 5E shows the angle $\alpha_2$ extending between the seat and the backrest in the support configuration. In this case, this angle is close to 120°. It is generally between 100° and 160°. This makes it possible to accommodate a person lying down, whose chest rests on the rear face of the backrest 20.2 and whose thighs rest on the seat 10, as described previously. It is clear that, in this support configuration, the chair permits a working position, facing the ground, which is particularly comfortable.

Also shown in FIG. 5E are the first and second rotation angles $\theta_{10}$ and $\theta_{20}$ corresponding respectively to the rotation of the seat 10 about the first axis of rotation 10a and of the backrest 20 about the second axis of rotation 20a. The first angle of rotation $\theta_{10}$ is in this case equal to 45°. It is generally between 20° and 80°, and preferably between 30° and 60°. The second angle of rotation $\theta_{20}$ is in this case equal to 100°. It is generally between 60° and 130°, and preferably between 70°, or even 80°, and 120°.

As described previously, the mount 19 comprises a hydraulic cylinder 19.1 allowing the chair to translate along the Z axis, transversely to the first seat plane $P_{10\text{-}1}$. Preferably, this translation is essentially perpendicular to the first seat plane. This translation may take place in both configurations of the chair. The mount 19 also permits a rotation of the chair 1 in an XY plane, about an axis of rotation parallel to the Z axis, this being possible in both configurations of the chair.

Figure 6A:
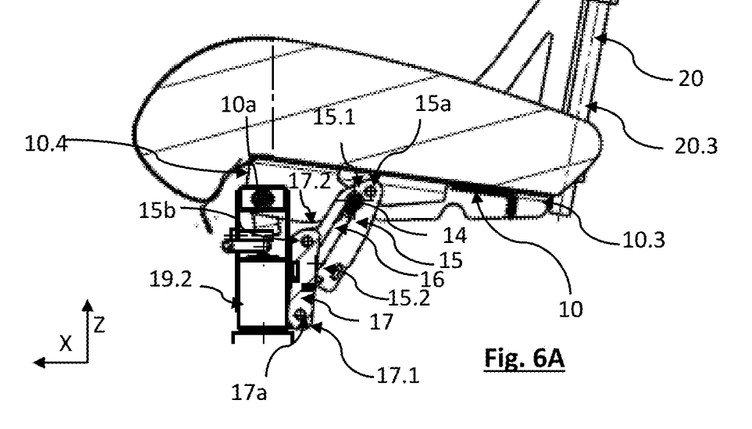
FIGS. 6A, 6B, 6C, 6D and 6E show an example of a drive mechanism, in configurations corresponding respectively to FIGS. 5A, 5B, 5C, 5D and 5E. These figures make it possible to visualize the motion of the drive mechanism allowing pivoting of the seat guided by pivoting of the backrest.
Figure 6B:
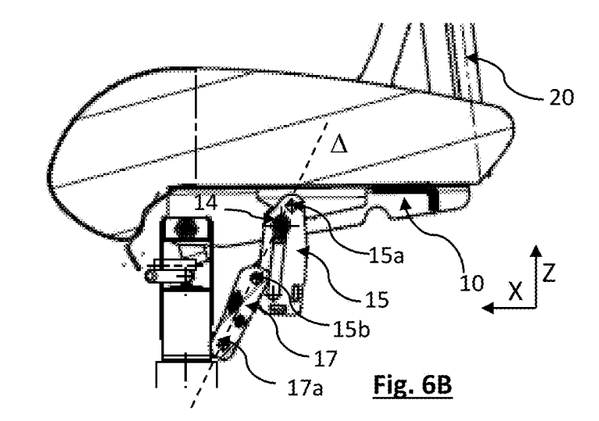
Figure 6C:
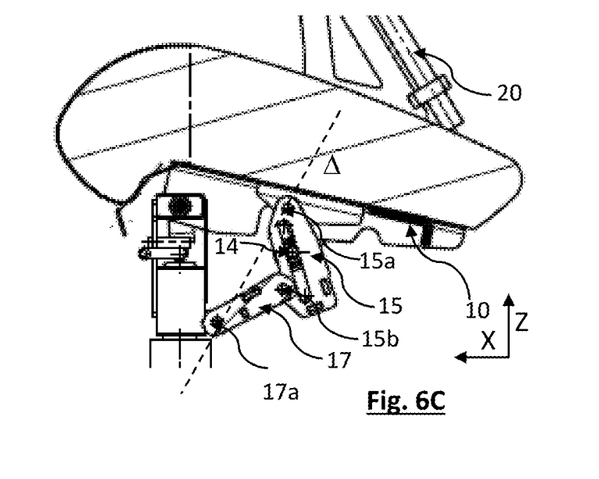
Figure 6D:
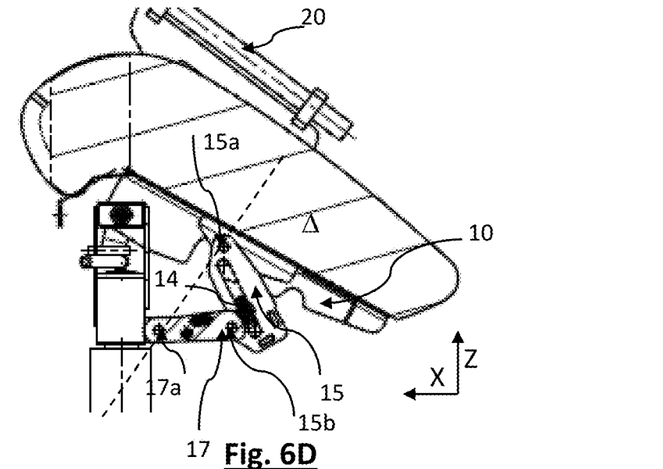
Figure 6E:
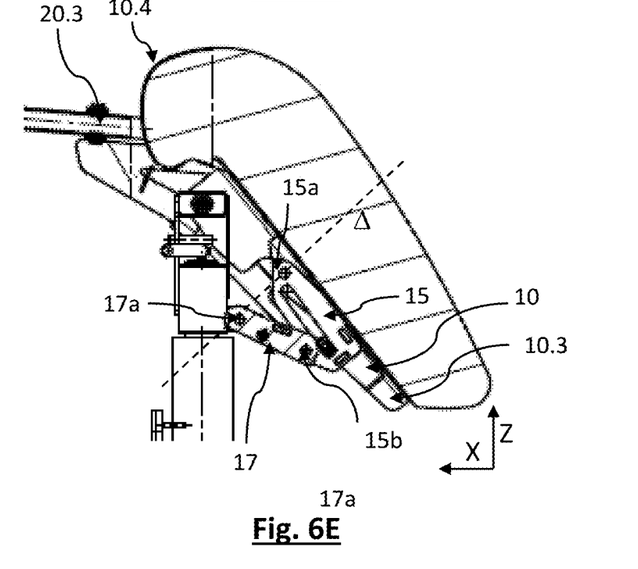

FIGS. 6A, 6B, 6C, 6D and 6E respectively show details of the drive mechanism 11 in the configurations corresponding to FIGS. 5A, 5B, 5C, 5D and 5E. These figures explain the movements of the transverse bar 14, of the first connecting rod 15 and of the second connecting rod 17 between the seating configuration (FIG. 6A) and the support configuration (FIG. 6E). As mentioned previously, in the seating configuration, the mount 19 acts as a first stop. The second connecting rod 17 pressing on the mount, under the effect of a force exerted by the first connecting rod 15, the transverse bar 14 pressing toward the first end 15.1 of this first connecting rod under the action of the backrest 20.

The third and fourth axes of rotation 15a and 17a are aligned along a line referred to as the inter-axis line Δ. It is understood in this context that the Z axis corresponds to the vertical axis, or is essentially parallel to the vertical axis. As long as the fifth axis of rotation 15b is located between this inter-axis line and the mount 19, the second connecting rod 17 tends to pivot spontaneously, about the fourth axis of rotation 17a, toward the support 19 under the effect of gravity exerted on the backrest or on the seat. FIG. 6B shows a particular intermediate configuration in which the third, fourth and fifth axes of rotation 15a, 17a and 15b are aligned along the inter-axis line Δ. This figure corresponds to the case in which the fifth axis of rotation 15b goes beyond this line Δ. In FIGS. 6C, 6D and 6E, the fifth axis of rotation 15b is located in a half-space bounded by the inter-axis line Δ and not including the mount 19. Gravity tends to urge the connecting rods 15 and 17 and the transverse bar 14 toward the support configuration shown in FIG. 6E. It is clear that the drive mechanism 11 requires little effort to switch between the seating position and the support position since, once the fifth rotation axis passes on one side of the inter-axis line Δ or the other, gravity contributes to switching, in one direction or the other.

FIG. 6E shows that, in the seating configuration, the first connecting rod 15 presses against the seat 10, with the seat acting as a second stop. Recesses are created in the seat 10 and are designed to receive the transverse bar in the seating configuration and in the support configuration. This makes it possible to avoid any twisting of the transverse bar.

Although described in the context of use on an agricultural device, the chair to which the invention relates can have other uses for improving the ergonomics of manual work, for example when tiling a large surface. Furthermore, a device may receive not just one chair, as described in the figures appended to this description, but a plurality of chairs.

A chair of this kind can also be useful in the field of healthcare, being designed for disabled people, those of reduced mobility, or those undergoing functional re-education. The very simple handling of this chair makes it possible to alternate between a seating configuration and an ergonomic configuration providing thoracic support. This latter configuration makes it possible to relieve pressure applied to certain parts of the body, for example the underside of the thighs or the lower back, when seated for excessive periods. Thus, a person can alternate between a seated position and an ergonomic lying-down position.

The invention claimed is:

1. An apparatus comprising a chair, wherein said chair comprises a seat and a backrest, wherein said backrest comprises a front face and a rear face, wherein said seat is configured to pivot about a first axis of rotation between a first seat position and a second seat position, wherein said back rest is configured to pivot about a second axis of rotation between a first backrest position and a second backrest position, said second axis of rotation being parallel to said first axis of rotation, wherein said first seat position defines a first seat plane, wherein said second seat position is inclined relative to said first seat plane, wherein said second backrest position is essentially parallel to said first seat plane such that said chair is configured to switch between a seating configuration and a support configuration, wherein, in said seating configuration, said seat is in said first seat position and said backrest is in said first backrest position such that said chair is suitable for accommodating a person seated on said seat, and wherein, in said support configuration, said seat is in said second seat position and said backrest is in said second backrest position such that said chair is suitable for accommodating a chest of a person on said rear face of said backrest.

2. The apparatus of claim 1, wherein, during switching between said seating configuration and said support configuration, said seat and said backrest pivot in opposite directions of rotation, respectively about said first and second axes of rotation.

3. The apparatus of claim 1, wherein, in said seating configuration, said seat and said backrest define a first angle, wherein, in said support configuration, said seat and said backrest define a second angle, wherein said first angle is greater than seventy degrees, and wherein said second angle is between one-hundred and ten degrees and one-hundred and eighty degrees.

4. The apparatus of claim 1, further comprising a drive mechanism, wherein said drive mechanism is configured to simultaneously pivot said seat and said backrest.

5. The apparatus of claim 1, wherein pivoting of said backrest triggers a drive mechanism, wherein, upon being triggered, said drive mechanism provides power for simultaneously pivoting said seat and said backrest.

6. The apparatus of claim 1, further comprising a seat mount upon which said seat rests and a drive mechanism that, upon being triggered by pivoting said backrest, provides power for simultaneously pivoting said seat and said backrest, wherein said drive mechanism comprises a first connecting rod, a second connecting rod, and a transverse bar, wherein said first connecting rod extends in a first longitudinal direction perpendicular to said first axis of rotation between a first end, which is fixed to said seat and a second end, wherein said first connecting rod comprising a slot that extends in along said first longitudinal direction, wherein said first connecting rod is configured for rotation about a third axis of rotation fixed to said seat, wherein said transverse bar is fixed to said backrest and extends transversely to said slot, wherein said transverse bar is configured to slide in said slot when said backrest pivots, wherein said second connecting rod extends in a second longitudinal direction between a first end and a second end, wherein said second longitudinal direction is perpendicular to said first axis of rotation, wherein said first end is fixed to said seat mount, wherein said second end is fixed to said second end of said first connecting rod, wherein said second connecting rod is configured to rotate about a fourth axis of rotation and a fifth axis of rotation, wherein said fourth axis of rotation is fixed to said seat mount, wherein said fifth axis of rotation is fixed to said first connecting rod, wherein translation of said transverse bar in said slot causes rotation of said first connecting rod and rotation of said second connecting rod, and wherein said rotation of said first connecting rod and said rotation of said second connecting rod are in opposite directions.

7. The apparatus of claim 1, wherein during pivoting between said first seat position and said second seat position, said seat rotates about said first axis of rotation through a rotation angle that is between twenty degrees and eighty degrees.

8. The apparatus of claim 1, in which said backrest extends between a proximal end and a distal end, said backrest comprising a headrest support that is arranged at a level of said distal end and of which said distance to said proximal end can vary.

9. The apparatus of claim 1, wherein said chair is configured to turn about a third axis of rotation, wherein said third axis of rotation is transverse to said first seat plane, wherein said chair is configured to turn about said third axis while said chair is in a configuration selected from the group consisting of said seating configuration and said support configuration.

10. The apparatus of claim 1, further comprising a chassis, wherein said chair rests on said chassis, wherein said chair is configured to translate relative to said chassis such that said chair can be made to move closer to said chassis or further from said chassis.

11. The apparatus of claim 1, further comprising a frame and a chassis, wherein said chair is fixed to said frame such that an assembly forming said chair and said frame is able to move towards or away from said chassis.

12. The apparatus of claim 1, further comprising an agricultural device that is configured to move over ground, wherein said chair is a constituent part of said agricultural device.

13. The apparatus of claim 1, wherein during pivoting between said first backrest position and said second backrest position, said backrest rotates about an angle that is between sixty degrees and one-hundred thirty degrees.

14. The apparatus of claim 1, wherein during pivoting between said first backrest position and said second backrest position, said backrest rotates about a first angle, and wherein during pivoting between said first seat position and said second seat position, said seat rotates about said first axis of rotation through a second angle, wherein said first angle is between sixty degrees and one-hundred thirty degrees, and wherein said second angle is between twenty degrees and eighty degrees.

* * * * *